(12) United States Patent
Tirronen et al.

(10) Patent No.: US 11,122,625 B2
(45) Date of Patent: Sep. 14, 2021

(54) USER EQUIPMENT, NETWORK NODE AND METHODS PERFORMED THEREIN

(71) Applicant: Telefonaktiebolaget LM Ericsson (publ), Stockholm (SE)

(72) Inventors: Tuomas Tirronen, Helsinki (FI); Johan Bergman, Stockholm (SE); Yufei Blankenship, Kildeer, IL (US); Emre Yavuz, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/754,621

(22) PCT Filed: Sep. 20, 2016

(86) PCT No.: PCT/SE2016/050881
§ 371 (c)(1),
(2) Date: Feb. 23, 2018

(87) PCT Pub. No.: WO2017/052452
PCT Pub. Date: Mar. 30, 2017

(65) Prior Publication Data
US 2018/0255585 A1 Sep. 6, 2018

Related U.S. Application Data

(60) Provisional application No. 62/233,038, filed on Sep. 25, 2015.

(51) Int. Cl.
*H04W 72/04* (2009.01)
*H04W 74/08* (2009.01)
(Continued)

(52) U.S. Cl.
CPC ..... *H04W 74/0833* (2013.01); *H04W 74/006* (2013.01); *H04W 74/0866* (2013.01); *H04W 4/70* (2018.02)

(58) Field of Classification Search
CPC .......... H04W 74/0833; H04W 74/006; H04W 74/0866; H04W 4/70
See application file for complete search history.

(56) References Cited

U.S. PATENT DOCUMENTS 9,854,609 B2 * 12/2017 Yang ..................... H04W 74/08
2012/0063393 A1 * 3/2012 Du ..................... H04W 36/0077
370/329
(Continued)

FOREIGN PATENT DOCUMENTS

EP      3606112 A1    2/2020
WO   2015012664 A1    1/2015
(Continued)

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.5.0, Mar. 2015, 1-77.
(Continued)

*Primary Examiner* — Brandon M Renner
(74) *Attorney, Agent, or Firm* — Murphy, Bilak & Homiller, PLLC

(57) ABSTRACT

Embodiments herein may relate to a method performed by a network node (115). The network node defines one or more parameters of a Coverage Enhanced Physical random access channel Configuration Index, CE PCI, for one or more Physical Random Access Channel, PRACH, resource sets, each of the one or more PRACH resource sets is associated with a coverage level whereby a different CE PCI is defined for each coverage level. The network node configures the one or more PRACH resource sets in a broadcast message. Furthermore, the network node assigns a starting subframe number to a PRACH resource set used by a UE, (110), and
(Continued)

calculates a Random Access Radio Network Temporary Identifier, RA-RNTI, using the assigned starting subframe number.

14 Claims, 7 Drawing Sheets

(51) Int. Cl.
  *H04W 74/00* (2009.01)
  *H04W 4/70* (2018.01)

(56) References Cited

U.S. PATENT DOCUMENTS

| | | |
|---|---|---|
| 2015/0016312 A1 | 1/2015 | Li et al. |
| 2016/0205671 A1* | 7/2016 | Tabet ................... H04W 72/042 370/329 |
| 2016/0338110 A1* | 11/2016 | Wang ..................... H04L 1/0009 |
| 2016/0353440 A1* | 12/2016 | Lee ................... H04W 72/0453 |
| 2017/0279646 A1* | 9/2017 | Yl .......................... H04L 5/0053 |
| 2017/0280484 A1* | 9/2017 | Awad ................... H04W 74/006 |
| 2018/0070385 A1 | 3/2018 | Yang et al. |
| 2018/0176957 A1* | 6/2018 | Zhang ....................... H04L 1/08 |

FOREIGN PATENT DOCUMENTS

| | | |
|---|---|---|
| WO | 2015012666 A1 | 1/2015 |
| WO | 2015109512 A1 | 7/2015 |

OTHER PUBLICATIONS

3GPP, "3rd Generation Partnership Project; Technical Specification Group Radio Access Network; Evolved Universal Terrestrial Radio Access (E-UTRA); Physical channels and modulation (Release 12)", 3GPP TS 36.211 V12.6.0, Jun. 2015, 1-136.

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.6.0, Jun. 2015, 1-449.

Unknown, Author, "PRACH design for Rel-13 MTC UEs and UEs in enhanced coverage", 3GPP TSG RAN WG1 Meeting #82, R1-153905, Beijing, China, Aug. 24-28, 2015, 1-3.

Panasonic , "RAR and Paging for MTC", 3GPP TSG RAN WG1 Meeting #82, R1-153972, Panasonic, Beijing, China, Aug. 24-29, 2015, 3 pages.

Unknown, Author, "Views on PRACH repetition in Rel-13 low complexity UE", 3GPP TSG RAN WG1 Meeting #82, R1-154531, NTT DOCOMO, Beijing, China, Aug. 24-28, 2015, 3 pages.

* cited by examiner

USER EQUIPMENT, NETWORK NODE AND METHODS PERFORMED THEREIN

TECHNICAL FIELD

The present disclosure relates, in general, to wireless communications and, more particularly, to calculating RA-RNTI for low complexity and/or coverage enhanced user equipment.

BACKGROUND

During the random access (RA) procedure in LTE, the eNB responds with Random Access Response (RAR) to the received preamble sequence sent by the user equipment (UE). The transmission of RAR is indicated in a control channel such as a Physical Downlink Control Channel (PDCCH) using Random Access Radio Network Temporary Identifier (RA-RNTI).

The RA-RNTI is formulated as follows (from TS 36.321 v 12,5,0):

5.1.4 Random Access Response reception

Once the Random Access Preamble is transmitted and regardless of the possible occurrence of a measurement gap, the Media Access Control (MAC) entity shall monitor the PDCCH of the SpCell for Random Access Response(s) identified by the RA-RNTI defined below, in the RA Response window which starts at the subframe that contains the end of the preamble transmission plus three subframes and has length ra-ResponseWindowSize subframes. The RA-RNTI associated with the PRACH in which the Random Access Preamble is transmitted, is computed as:

$$RA\text{-}RNTI = 1 + t\_id + 10 * f\_id$$

Where t_id is the index of the first subframe of the specified PRACH (0≤t_id<10), and f_id is the index of the specified PRACH within that subframe, in ascending order of frequency domain (0≤f_id<6). The MAC entity may stop monitoring for Random Access Response(s) after successful reception of a Random Access Response containing Random Access Preamble identifiers that matches the transmitted Random Access Preamble.

The indices t_id and f_id depend on if frame structure type 1 or 2, i.e., Frequency Division Duplex (FDD) or Time Division Duplex (TDD) is used, and definitions of the possible alternatives can be found in section 5.7 of TS 36.211 v 12.6.0. A Physical Random Access Channel (PRACH) Configuration Index (PCI) is configured by higher layers and the physical layer selects or uses indices t_id and f_id based on PCI.

The current value range of RA-RNTI is from 1 to 60 (0001 to 003C in hexadecimal, defined in TS 36.321 section 7.1).

For 3GPP Rel-13 operation for bandwidth limited Low Complexity (LC) UEs and UEs operating in coverage enhancements (CE), it is expected that a number of time repetitions will be used to transmit Random Access Preambles, RAR messages, and the control channel such as M-PDCCH to schedule a RAR message. This means the transmission times will be extended, and for different coverage levels different numbers of repetitions will be used. The repetition factors will be configurable by eNB.

The bandwidth limited LC UEs are able to receive bandwidth of 6 physical resource blocks (PRBs) at a time. Thus, the total system bandwidth is divided into narrowbands where each narrowband corresponds to 6 PRBs.

After the UE sends the PRACH preamble, it listens for RAR for a time duration indicated by an RA response window, which is currently defined to start at subframe n+3, where n is the last subframe of preamble transmission. The RA response window operation is specified in TS 36.321, and the possible configuration options are in TS 36.331 v12.6.0.

Some agreements which have been made so far in RAN1 regarding random access and LC and/or CE UEs for Rel-13:
  There is one to one mapping between a PRACH repetition level and a PRACH resource set;
  The UE determines based on Reference Signal Received Power (RSRP) measurement whether or not to start using one of the PRACH resource sets for CE, i.e., PRACH transmission with repetitions;
  The UE knows repetition level of transmission of RAR from the repetition level of its most recent PRACH;
    For further study: whether the repetition level is a function of the Transport Block Size (TB S) of the RAR or not;
    For further study: the detailed mapping from the repetition level of
  PRACH to that of RAR;
  The UE knows in which subframe(s) transmission of RAR can begin from its most recent PRACH resource set;
  The UE knows in which frequency resource(s) transmission of RAR can occur from its most recent PRACH resource set;
    Note: if option 1 is adopted, this does not preclude the possibility of specifying a single frequency resource for M-PDCCH.

When time repetitions are used for the Rel-13 LC/CE UEs, if the RA-RNTI is calculated as currently specified, there is a possibility that different RA response windows have overlapping RA-RNTIs so that UEs operating different coverage enhancements levels may end up searching for the same RA-RNTI for different RAR time/frequency resources although they started their preamble transmissions in separate time instants. This can potentially lead to increased contention probability resulting in a reduced or limited performance of the communication network.

SUMMARY

An object according to embodiments herein is to provide a mechanism that provides an improved performance for Low Complexity (LC) and/or coverage enhanced UEs.

According to an aspect the object is achieved by providing a method performed by a network node. The network node defines, one or more parameters of a Coverage Enhanced Physical random access channel Configuration Index (CE PCI) for one or more PRACH resource sets. Each of the one or more PRACH resource sets is associated with a coverage level whereby a different CE PCI is defined for each coverage level. The network node configures the one or more PRACH resource sets in a broadcast message. Furthermore, the network node assigns a starting subframe number to a PRACH resource set used by a UE, and calculates an RA-RNTI, using the assigned starting subframe number.

According to another aspect the object is achieved by providing a method performed by a UE. The UE chooses, a PRACH resource set according to a coverage level, each PRACH resource set having an associated CE PCI. The UE transmits a random access preamble to a network node, and receives a random access response identified by an RA-RNTI. The RA-RNTI is calculated using a starting subframe number assigned to the PRACH resource set used by the UE.

According to yet another aspect the object is achieved by providing a network node configured to define one or more parameters of a CE PCI for one or more PRACH resource sets, each of the one or more PRACH resource sets is associated with a coverage level whereby a different CE PCI is defined for each coverage level. The network node is further configured to configure the one or more PRACH resource sets in a broadcast message. Furthermore, the network node is configured to assign a starting subframe number to a PRACH resource set used by a UE, and to calculate an RA-RNTI using the assigned starting subframe number.

According to still another aspect the object is achieved by providing a UE configured to choose a PRACH resource set according to a coverage level, each PRACH resource set having an associated CE PCI. The UE is further configured to transmit a random access preamble to a network node; and to receive a random access response identified by an RA-RNTI, wherein the RA-RNTI is calculated using a starting subframe number assigned to the PRACH resource set used by the UE.

Embodiments herein provide one or more technical advantages. As the RA-RNTI is calculated from starting subframe number assigned to PRACH resource set based on coverage level, and is used by the UE to start PRACH preamble transmissions, the contention problem can be alleviated and the network node can distribute the starting locations of the preamble transmissions according to the UE CE levels. There may be different PCIs, and other parameters, configured per CE level, and the UE may then select the possible starting subframe(s) based on the CE level.

For example, in certain embodiments RA-RNTI calculation is modified so that it can be used with Rel-13 LC and/or CE UEs. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, the existing method of calculating RA-RNTI can potentially lead to increased contention probability when time repetitions are used for Rel-13 LC/CE UEs. This is due to the possibility that different RA response windows may have overlapping RA-RNTIs, so that UEs operating different coverage enhancements levels may end up searching for the same RA-RNTI for different RAR time/frequency resources although they started their preamble transmissions in separate time instants. The present disclosure contemplates various embodiments that may address these and other deficiencies associated with existing solutions. For example, the existing RA-RNTI calculation may be modified so that the repetition factors used are better taken into account, and RA-RNTI can be better used to check if the related RAR transmission is really intended for the UE searching for the transmission with the correct RA-RNTI. In certain embodiments, a method is disclosed that may be implemented in UE and/or eNB to calculate the RA-RNTI which UE uses to search and receive downlink control channel (e.g. M-PDCCH). Depending on the system/cell configuration, it is possible that UEs in different coverage levels use different narrowbands to transmit PRACH preambles and/or receive RAR. The various embodiments described herein may advantageously modify the RA-RNTI calculation so it can be used with Rel-13 LC and/or CE UEs.

Figure 1A:
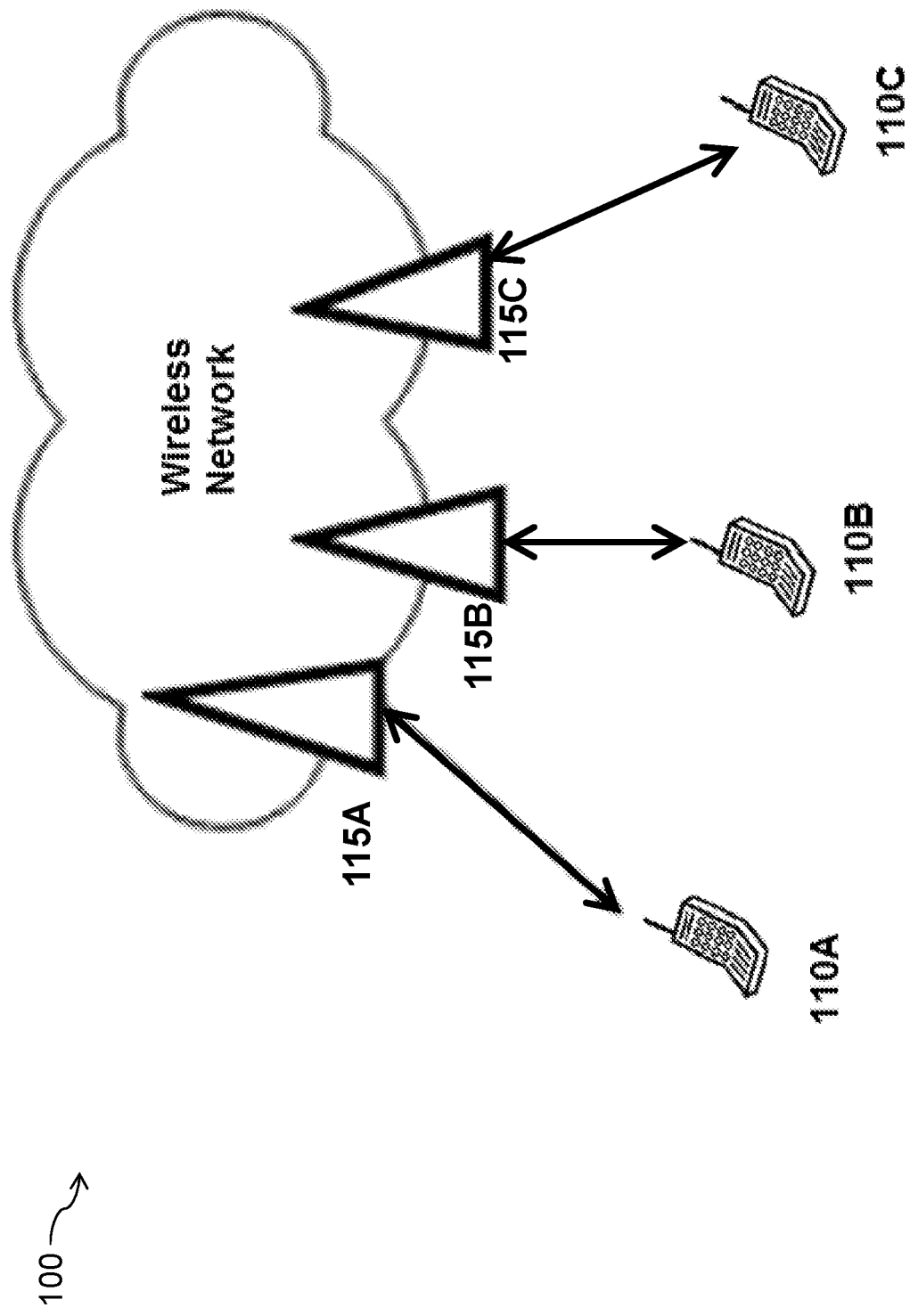
FIG. 1a is a block diagram illustrating an embodiment of a network, in accordance with certain embodiments.

FIG. 1a is a block diagram illustrating an embodiment of a network 100, in accordance with certain embodiments. Network 100 includes one or more UE(s) 110, exemplified herein as UE 110A, UE 110B and UE 110C, which UEs may be interchangeably referred to as wireless devices 110, network node(s) 115, exemplified herein as network node 115A, network node 115B and UE network node 115C, which network nodes may be interchangeably referred to as eNodeBs (eNBs) 115. UEs 110 may communicate with network nodes 115 over a wireless interface. For example, UE 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, UEs 110 may have Device to Device (D2D) capability. Thus, UEs 110 may be able to receive signals from and/or transmit signals directly to another UE. For example, UE 110A may be able to receive signals from and/or transmit signals to UE 110B.

In certain embodiments, the network nodes 115 may interface with a radio network controller. The radio network controller may control the network nodes 115 and may provide certain radio resource management functions, mobility management functions, and/or other suitable functions. In certain embodiments, the functions of the radio network controller may be performed by the network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for the UEs 110. The UEs 110 may exchange certain signals with the core network node using the non-access stratum layer. In non-access stratum signaling, signals between the UEs 110 and the core network node may be transparently passed through a radio access network. In certain embodiments, the network nodes 115 may interface with one or more network nodes over an internode interface. For example, network nodes 115A and 115B may interface over an X2 interface.

As described above, example embodiments of network 100 may include one or more wireless devices 110, and one or more different types of network nodes capable of communicating, directly or indirectly, with wireless devices 110. In some embodiments, the non-limiting term UE is used. UEs 110 described herein can be any type of wireless device capable of communicating with network nodes 115 or another UE over radio signals. UE 110 may also be a radio communication device, target device, device-to-device (D2D) UE, machine-type-communication UE or UE capable of machine to machine communication (M2M), a sensor equipped with UE, iPad, Tablet, mobile terminals, smart phone, laptop embedded equipped (LEE), laptop mounted equipment (LME), USB dongles, Customer Premises Equipment (CPE), etc. Also, in some embodiments generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, remote RF unit (RRU), remote radio head (RRH), RRU, RRH, nodes in distributed antenna system (DAS), core network node (e.g. a mobile switching center (MSC), a mobility management entity (MME) etc), Operations & Maintenance (O&M), Operations Support System (OSS), Self-Organizing Network (SON), positioning node e.g. Evolved Serving Mobile Location Center (E-SMLC), Minimization of Drive Tests (MDT), or any suitable network node. Example embodiments of UEs 110, network nodes 115, and other network nodes, such as radio network controller or core network node, are described in more detail with respect to FIGS. 3, 4, and 5, respectively.

Although FIG. 1a illustrates a particular arrangement of the network 100, the present disclosure contemplates that the various embodiments described herein may be applied to a variety of networks having any suitable configuration. For example, the network 100 may include any suitable number of UEs 110 and network nodes 115, as well as any additional elements suitable to support communication between UEs or between a UE and another communication device (such as a landline telephone). Furthermore, although certain embodiments may be described as implemented in a long term evolution (LTE) network, the embodiments may be implemented in any appropriate type of telecommunication system supporting any suitable communication standards and using any suitable components, and are applicable to any radio access technology (RAT) or multi-RAT systems in which the UE receives and/or transmits signals (e.g., data). For example, the various embodiments described herein may be applicable to Long Term Evolution (LTE), LTE-Advanced, Universal Mobile Telecommunications System (UMTS), High Speed Packet Access (HSPA), Global System for Mobile communications (GSM), cdma2000, WiMax, WiFi, another suitable radio access technology, or any suitable combination of one or more radio access technologies.

Case 1: Different PRACH Repetition Levels Map to RAR in the Same Narrowband

This case applies, for example, with small system bandwidth, such as when there are fewer narrowbands than possible coverage levels for UEs.

In one embodiment the starting subframe number t_id may be assigned per the used PRACH resource set. The PRACH resource set is chosen by the UE 110 depending on the coverage level. In this case, each PRACH resource set may have its own coverage-enhanced PRACH Configuration Index (CE PCI), where a different CE PCI is defined for each coverage level. A list of possible CE PCIs may be defined and available for configuration for a cell. Typically, a higher layer configuration, i.e., RRC signaling, is used by the network node 115, e.g. eNB, to configure the CE PRACH resource in a broadcast message. The broadcast message is usually a system information message for Machine-Type-Communication (MTC) operation and the UE 110 receives the system information and stores e.g. the list of CE PCIs and related parameters for each configured CE level, also referred to as coverage level.

The parameters defined for a CE PCI may be any suitable parameters. For example, the parameters defined for a CE PCI could include (not limiting):
PRACH Configuration Index, as defined in legacy system;
Number of repetitions of the legacy random access preamble defined by PRACH Configuration Index;
Starting system frame number (SFN). This provides a set of possible starting SFNs that the UE 110 may select from to start a PRACH transmission. The PRACH transmission may entail multiple repetitions of a preamble for a random access attempt.
  In one alternative, the possible starting SFN is predefined. For example: system frame number with odd, or even, or any value.
  In another alternative, the possible starting SFN is defined as a function of cell ID.
  In another alternative, the possible starting SFN is a function of the coverage enhancement level of the given CE PCI.
  In another alternative, the possible starting SFN is a function of the number of PRACH repetitions associated with the given CE. For example:
    Starting SFN=Ceiling(number of repetitions/X)*N, where X is the number of PRACH repetitions UE can perform within a radio frame, and N is an integer. X is provided by PRACH Configuration Index.
Starting subframe of a PRACH attempt, where one PRACH attempt may involve multiple repetitions. The starting subframe is a subframe within the starting SFN. The UE 110 may start transmitting PRACH in a PRACH attempt from the starting subframe of a starting SFN.

One of the parameters such as the starting subframe e.g. prach-StartingSubframe may also be assigned per CE level but may be separate from PCI, and this parameter may tell the periodicity of where the PRACH transmission can be started, meaning that this parameter is further used to calculate the exact location such as both SFN and subframe, where a PRACH transmission could be attempted. Thus the SFN id is additionally used in the RA-RNTI calculation. The starting SFN may be calculated based on the starting subframe number and the mentioned periodicity parameter. PCI already tells if odd or even SFN is used, which is the same as in legacy. The periodicity parameter depends on the CE level such as the number of repetitions.

The preamble format used by the UE 110 may be provided by the PRACH Configuration Index as in a legacy system. Instead of broadcasting a single PCI in system information, which is the current operation, the network node 115 may transmit multiple CE PCIs, where each PCI corresponds to a CE level also referred to as coverage level.

In another embodiment, RA-RNTI calculation may be changed to reflect different possible PRACH repetition levels used within the same narrowband. For example, re-use f_id to indicate the repetition level where 0 refers to no repetition, 1 to first CE level (e.g., 5 dB), 2 to second CE level (e.g., 10 dB) and so on.

Hence, for the UE 110 with enhanced coverage, for each PRACH coverage enhancement level, there is a PRACH configuration configured by higher layers with a PRACH configuration index denoted herein as CE PCI. There may further be additional configured parameters per each PRACH coverage enhancement level, such as a PRACH starting subframe periodicity per coverage level and/or a number of PRACH repetitions per attempt.

Case 2: Different PRACH Repetition Levels Map to RAR in Different Narrowbands

If different PRACH resource sets are mapped to different RAR narrowbands then there may be no reason to indicate the PRACH resource set in the RA-RNTI, as based on the current RAN1 agreements the UE would know the frequency resources/narrowband used for the RAR transmission. If, however, it is seen that the narrowband needs to be indicated, in one embodiment f_id could be used for this purpose. For example, f_id could be directly used to enumerate the used narrowband or, if only certain narrowbands are used for RAR transmission, f_id could be used to enumerate those specific narrowbands. It might also be necessary to extend the range of f_id to cover all possible narrowband options. In an alternative embodiment, t_id may be changed to enumerate different preamble starting locations in different narrowbands.

In one embodiment, the t_id in the RA-RNTI calculation may still refer to the first subframe in a PRACH transmission, but now the "first subframe" is not necessarily 1 out of 10 subframes in a 10-ms frame but rather 1 out of X starting opportunities in a Y-ms period. This may be expressed as:

$Y = X * \text{PRACH repetition level}$, where X should be chosen large enough so that Y is longer than the RAR window. In one alternative, f_id is further used to define X by mapping different values of f_id to values of X.

Different PRACH resource sets may start at different subframes, similar to legacy PRACH resource configurations specified in 36.211 Table 5.7.1-2 (FDD) and Table 5.7.1-3 (TDD). Today, for example, it is possible that different PRACH resource configurations may be used in different cells of a network node, e.g., eNB, in order to distribute the PRACH attempts in time and be able to handle several cells using a single PRACH receiver.

A PRACH with repetition may span over multiple radio frames—how many frames depends both on the PRACH repetition level and on how many subframes are available for PRACH in every frame for the configured PRACH resource set.

For each PRACH resource set the allowed starting subframes could be chosen such that there are no unused PRACH subframes except at the end of the SFN range, i.e. when the SFN approaches 1023, which is the current maximum SFN, in some alternatives Hyper-SFN, to be specified in extended Discontinuous Reception (eDRX) context, is used instead. When a CE UE with a particular PRACH repetition level ends its PRACH transmission in a particular PRACH subframe, another CE UE will then be able to start its PRACH transmission in the next available PRACH subframe, the next available PRACH subframe according to the configured PRACH resource set for that PRACH repetition level.

This way RA-RNTI equation is almost the same but with t_id now referring to the ordinal number of the allowed PRACH starting positions, meaning that t_id=0 would correspond to the first PRACH starting position after subframe 0 in SFN 0. In some embodiments, the range of t_id is extended from current, which is 0 to 9, to avoid ambiguities within the RA response window.

Figure 1B:
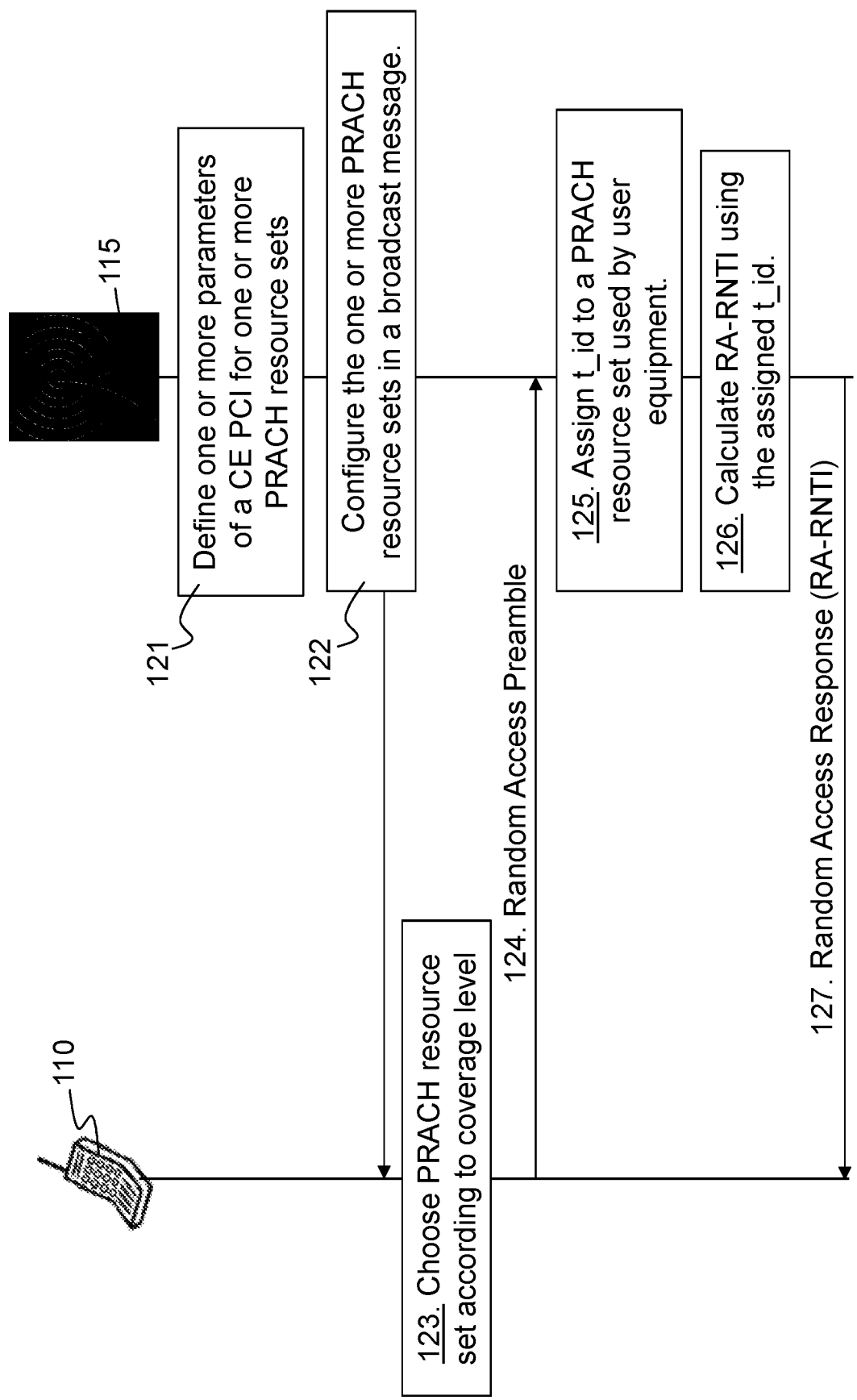
FIG. 1b is a combined flowchart and signaling scheme according to embodiments herein.

FIG. 1b is a combined flowchart and signaling scheme depicting example embodiments herein. The Actions below may be taken in any suitable order.

Action 121. The network node 115 defines one or more parameters of a CE PCI for one or more PRACH resource sets, each of the one or more PRACH resource sets is associated with a coverage level whereby a different CE PCI is defined for each coverage level. The network node 115 may e.g. assign PCI per CE level, the UE 110 then knows what the preamble format is, even or odd SFN and subframe number, and where to transmit the preamble.

Action 122. The network node 115 further configures the one or more PRACH resource sets in the broadcast message.

Action 123. The user equipment 110 chooses PRACH resource set according to a coverage level, wherein each PRACH resource set has an associated CE PCI.

Action 124. The user equipment 110 transmits a random access preamble to the network node 115.

Action 125. The network node 115 assigns a starting subframe number such as e.g. the t_id to a PRACH resource set used by the UE 110

Action 126. The network node 115 further calculates the RA-RNTI using the assigned starting subframe number or e.g. the starting subframe number, which was used to start the PRACH repetitions. E.g. there may be multiple possible t_id and the network node 115 will know this based on which subframe the UE 110 used to start the PRACH transmission.

Action 127. The network node 115 may then further transmit to the UE 110 a random access response identified by the calculated RA-RNTI.

As mentioned above, the Actions may be taken in any suitable order. E.g. the Action 125 may be taken as the first action before Actions 121-124. See in the example below:

Action 125. The network node 115 assigns possible starting subframe numbers such as e.g. t_id to a PRACH resource set used by the UE 110. There may be several starting subframe numbers, if there are, the UE 115 may select some. For example, the UE 110 may use the starting subframe number such as the t_if which is one of the possible starting subframes according to PCI. Thus, if the network node 115 does any such assignment it it is preferred to be before sending the PCI, such as the configuration, to the UE 115.

Action 121. The network node 115 defines one or more parameters of a CE PCI for one or more PRACH resource sets, each of the one or more PRACH resource sets is associated with a coverage level whereby a different CE PCI is defined for each coverage level.

Action 122. The network node 115 further configures the one or more PRACH resource sets in the broadcast message.

Action 123. The user equipment 110 may choose PRACH resource set according to a coverage level, each PRACH resource set having an associated CE PCI.

Action 124. The user equipment 110 transmits a random access preamble to the network node 115.

Action 126. The network node 115 further calculates the RA-RNTI using the assigned starting subframe number or the starting subframe number which was used to start the PRACH repetitions.

Figure 2A:
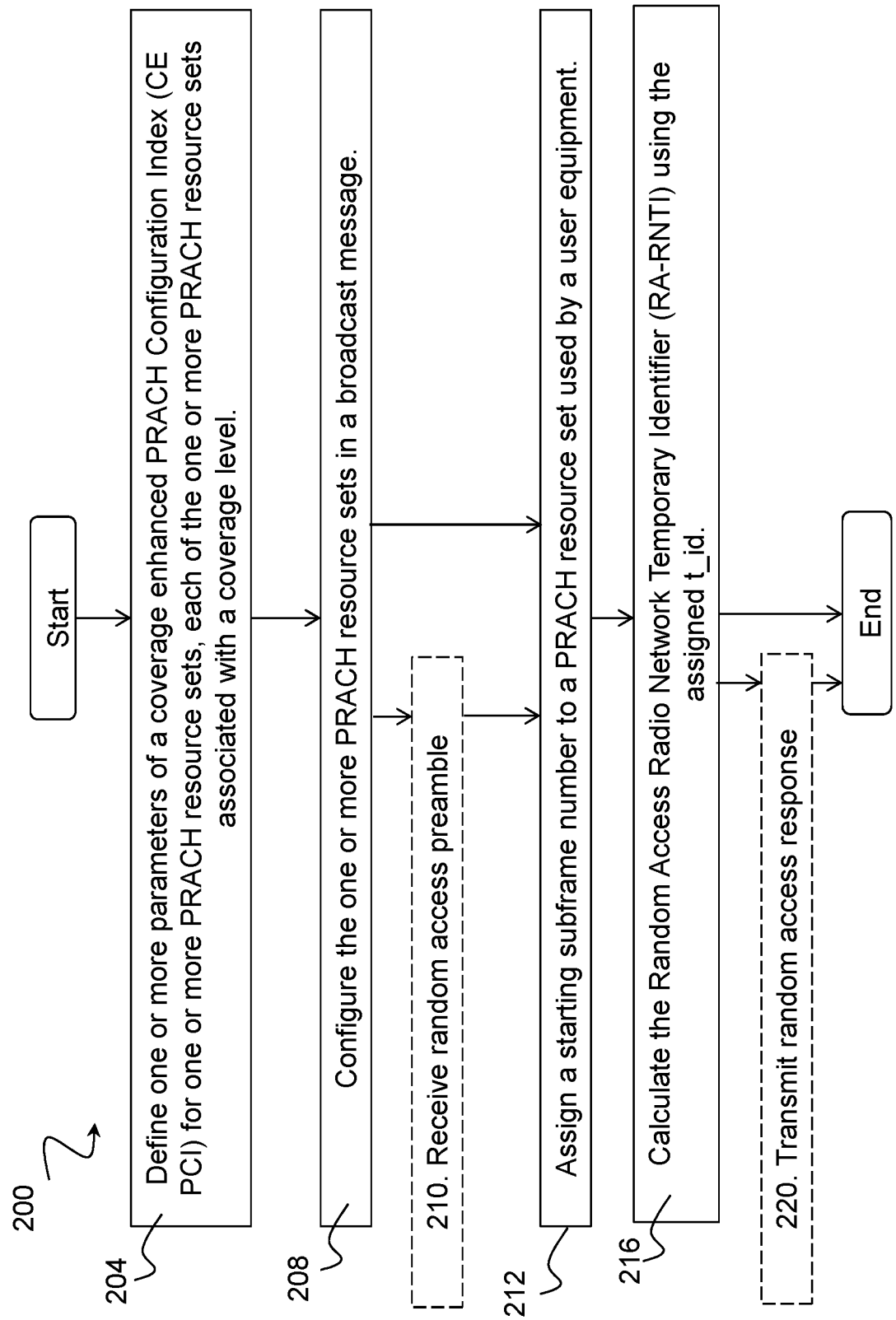
FIG. 2a is a flow diagram of a method in a network node, in accordance with an embodiment.

Action 127. The network node 115 may then further transmit to the UE 110 a random access response identified by the calculated RA-RNTI FIG. 2a is a flow diagram of a method 200 performed by the network node 115.

The method comprises the following Actions, which Actions may be taken in any suitable order.

Action 212 below may according to some embodiments start the method as stated above in FIG. 1b.

Action 204. The network node 115 defines one or more parameters of the CE PCI for one or more PRACH resource sets. Each of the one or more PRACH resource sets is associated with a coverage level whereby a different CE PCI is defined for each coverage level. At Action 204, hence, the network node 115 defines a CE PCI for one or more PRACH resource sets, each of the one or more PRACH resource sets is associated with a coverage level. This corresponds to action 121 in FIG. 1b. The defined one or more parameters may comprise any one or more out of: a PRACH Configuration Index e.g. as defined in legacy system, a number of repetitions of a legacy random access preamble defined by the PRACH Configuration Index, a starting System Frame Number (SFN) and a starting subframe of a PRACH attempt, e.g. where one PRACH attempt may involve multiple repetitions.

Action 208. The network node 115 further configures the one or more PRACH resource sets in the broadcast message. This corresponds to action 122 in FIG. 1b. A higher layer configuration, such as RRC signaling, may be used by the network node 115 to configure the one or more PRACH resource sets in the broadcast message. The network node 115 may e.g. broadcast one or more CE PCIs.

Action 210. The network node 115 may then receive the random access preamble from the UE 110.

Action 212. If not already performed, the network node 115 then assigns the starting subframe number to the PRACH resource set used by the UE 110. The starting subframe number may be denoted as t_id. This corresponds to action 125 in FIG. 1b. The starting subframe number may indicate one of: a first subframe in a PRACH transmission; and one of X starting opportunities in a Y-ms period, where Y=X*PRACH repetition level.

Action 216. The network node 115 calculates the RA-RNTI using the assigned starting subframe number, t_id. The network node 115 may further calculate the RA-RNTI based at least in part on PRACH repetition levels used within a narrowband. In some embodiments the starting System Frame Number (SFN) is used in the RA-RNTI calculation, such as e.g. the specific starting subframe number the UE 110 uses to start the transmissions of the PRACH preambles. In some embodiments an indicator, exemplified herein as f_id, may be used to enumerate a used narrowband.

Action 220. The network node 115 may transmit to the UE 110 the random access response identified by the calculated RA-RNTI.

As mentioned above, the Actions may be taken in any suitable order. According to some example embodiments the method may be performed according to the following suitable order:

The network node 115 assigns 212 a starting subframe numbers to a PRACH resource set used by the UE 110.

The network node 115 then defines 204 one or more parameters of the CE PCI for one or more PRACH resource sets, where each of the one or more PRACH resource sets is associated with a coverage level whereby a different CE PCI is defined for each coverage level.

The network node 115 configures 208 the one or more PRACH resource sets in the broadcast message, and calculates 216 the RA-RNTI using the assigned starting subframe number or the starting subframe number used to transmit the first repetition of PRACH preamble.

In these embodiments, the PCI for each CE level is selected first and the selected PCI then maps to one or more possible starting subframe numbers. Thus the assignment Action 212 may not be a separate step, but is may also be included already in Action 204 or executed before that. One possible implementation is such where the network node 110 first selects the starting subframe number, or possible starting subframe numbers, and after that assigns PCI per CE level based on that. Thus the configuration is preformed such that there can be a separate PCI per CE level.

Figure 2B:
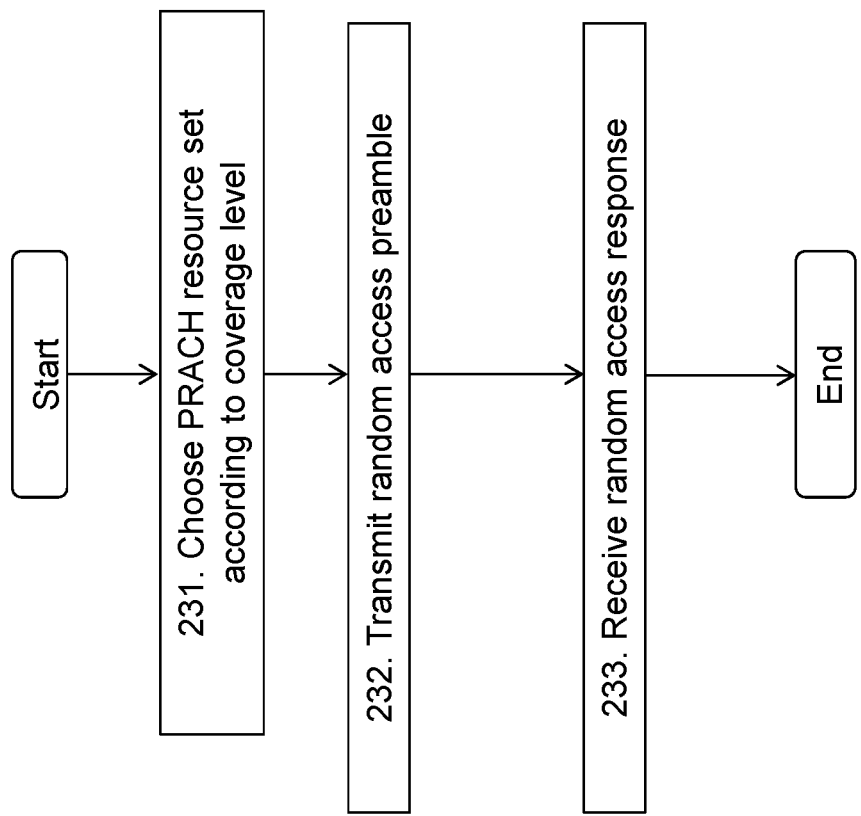
FIG. 2b is a flow diagram of a method in a wireless device, in accordance with an embodiment.

FIG. 2b is a schematic flowchart depicting a method performed by the UE 110 according to embodiments herein.

Action 231. The UE 110 chooses a PRACH resource set according to a coverage level, each PRACH resource set having an associated CE PCI. The UE 110 may be configured by the network node 115 by receiving in the broadcast message the configured one or more PRACH resource sets. The UE 10 may receive the higher layer configuration, such as RRC signaling, from the network node 115 to configure the one or more PRACH resource sets in the broadcast message. The UE 110 may receive one or more CE PCIs broadcasted from the network node 115.

Action 232. The UE 110 transmits the random access preamble to the network node 115.

Action 233. The UE 110 receives the random access response identified by the RA-RNTI, which RA-RNTI is calculated using a starting subframe number assigned to the PRACH resource set used by the UE 110.

An advantage is thus that there may be different PCI, and other parameters, configured per CE level, and the UE 110 may then selects the possible starting subframe(s) based on the CE level.

Figure 3:
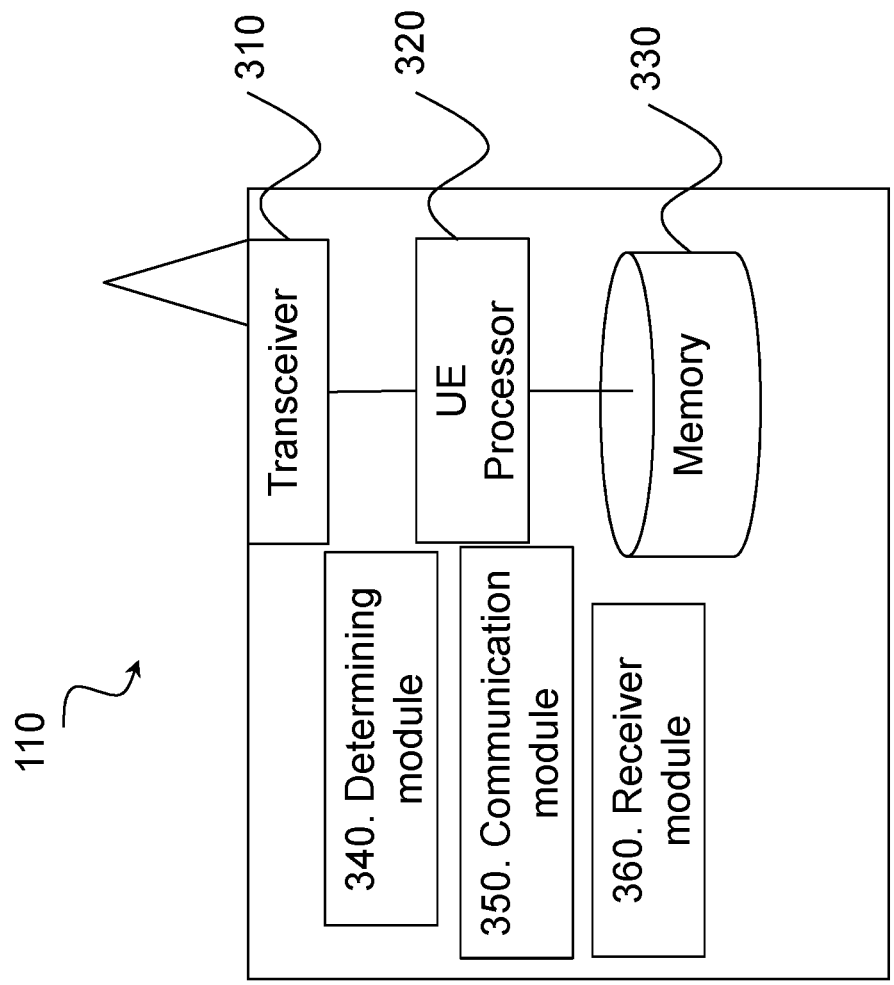
FIG. 3 is a schematic block diagram of an exemplary wireless device, in accordance with certain embodiments.

FIG. 3 is a block schematic of an exemplary wireless device 110, also referred herein as the UE 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes a transceiver 310, a processor 320, and a memory 330. In some embodiments, transceiver 310 facilitates transmitting wireless signals to and receiving wireless signals from network node 115 (e.g., via an antenna), processor 320 executes instructions to provide some or all of the functionality described above as being provided by wireless device 110, and memory 330 stores the instructions executed by processor 320.

The UE 110 may comprise a determining module 340. The UE 110, the determining module 340 and/or the processor 320 may be configured to choose the PRACH resource set according to the coverage level, each PRACH resource set having an associated Coverage Enhanced PRACH Configuration Index, CE PCI.

Furthermore, the UE 110 may comprise a communication module 350 and a receiver module 360. The UE 110, the transceiver 310, the communication module 350 and/or the processor 320 may be configured to transmit the random access preamble to the network node 115. In addition, the UE 110, the transceiver 310, the receiver module 360 and/or the processor 320 may be configured to receive the random access response identified by the RA-RNTI, wherein the RA-RNTI is calculated using the starting subframe number assigned to the PRACH resource set used by the UE 110.

Processor 320 may include any suitable combination of hardware and software implemented in one or more modules to execute instructions and manipulate data to perform some or all of the described functions of wireless device 110. In some embodiments, processor 320 may include, for example, one or more computers, one or more central processing units (CPUs), one or more microprocessors, one or more applications, and/or other logic.

Memory 330 is generally operable to store instructions, such as a computer program, software, an application including one or more of logic, rules, algorithms, code, tables, etc.

and/or other instructions capable of being executed by a processor. Examples of memory 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 3 that may be responsible for providing certain aspects of the wireless device's functionality, including any of the functionality described above and/or any additional functionality (including any functionality necessary to support the solution described above).

In certain embodiments, wireless device 110 may include one or more modules. For example, wireless device 110 may include the determining module 340, a communication module 350, a receiver module 360, an input module, a display module, and any other suitable modules. The determining module 340 may perform the processing functions of wireless device 110. The determining module may include or be included in processor 320. The determining module may include analog and/or digital circuitry configured to perform any of the functions of the determining module and/or processor 320. The functions of the determining module described above may, in certain embodiments, be performed in one or more distinct modules.

The communication module may perform the transmission functions of wireless device 110. The communication module may transmit messages to one or more of network nodes 115 of network 100. The communication module may include a transmitter and/or a transceiver, such as transceiver 310. The communication module may include circuitry configured to wirelessly transmit messages and/or signals. In particular embodiments, the communication module may receive messages and/or signals for transmission from the determining module.

The receiving module may perform the receiving functions of wireless device 110. The receiving module may include a receiver and/or a transceiver. The receiving module may include circuitry configured to wirelessly receive messages and/or signals. In particular embodiments, the receiving module may communicate received messages and/or signals to the determining module.

The input module may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to the determining module.

The display module may present signals on a display of wireless device 110. The display module may include the display and/or any appropriate circuitry and hardware configured to present signals on the display. The display module may receive signals to present on the display from the determining module.

Figure 4:
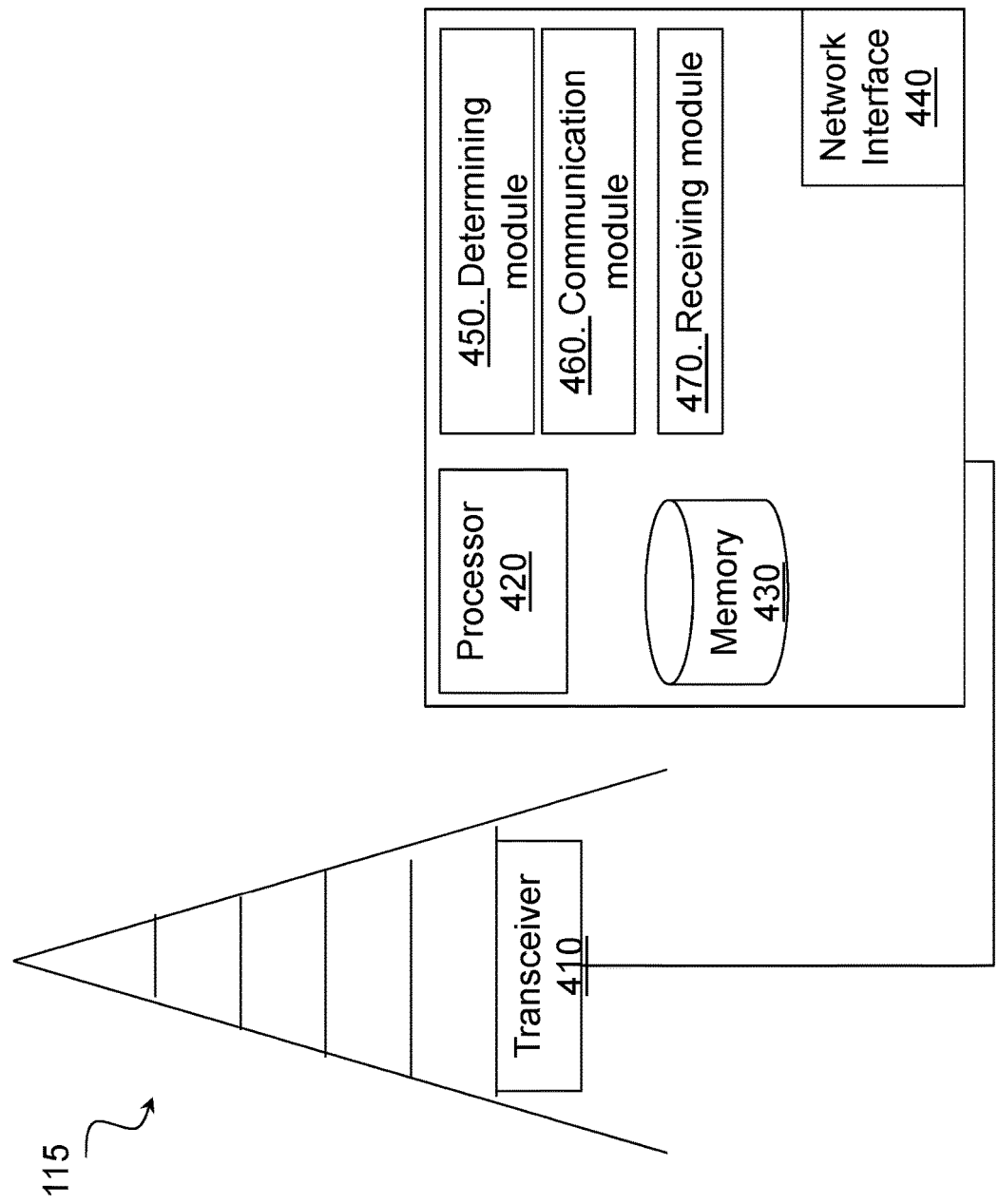
FIG. 4 is a schematic block diagram of an exemplary network node, in accordance with certain embodiments.

FIG. 4 is a block schematic of an exemplary network node 115, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of a transceiver 410, a processor 420, a memory 430, and a network interface 440. In some embodiments, transceiver 410 facilitates transmitting wireless signals to and receiving wireless signals from wireless device 110 (e.g., via an antenna), processor 420 executes instructions to provide some or all of the functionality described above as being provided by a network node 115, memory 430 stores the instructions executed by processor 420, and network interface 440 communicates signals to backend network components, such as a gateway, switch, router, Internet, Public Switched Telephone Network (PSTN), core network nodes or radio network controllers 130, etc.

In certain embodiments, network node 115 may include a determining module 450, a communication module 460, a receiving module 470, and any other suitable modules. In some embodiments, one or more of the determining module, communication module, receiving module, or any other suitable module may be implemented using one or more processors 420 of FIG. 4. In certain embodiments, the functions of two or more of the various modules may be combined into a single module.

The network node 115, the determining module 450, and/or the processor 420 may be configured to define one or more parameters of the CE PCI for one or more PRACH resource sets. Each of the one or more PRACH resource sets is associated with the coverage level, whereby a different CE PCI is defined for each coverage level. The defined one or more parameters may comprise any one or more out of: a PRACH Configuration Index, a number of repetitions of a legacy random access preamble defined by the PRACH Configuration Index, a starting System Frame Number, SFN, and a starting subframe of a PRACH attempt.

The network node 115, the communication module 460, and/or the processor 420 may be configured to configure the one or more PRACH resource sets in the broadcast message.

The network node 115, the determining module 450, and/or the processor 420 may be configured to assign the starting subframe number to the PRACH resource set used by the UE 110, and to calculate the RA-RNTI, using the assigned starting subframe number. The network node 115, the determining module 450, and/or the processor 420 may be configured to calculate the RA-RNTI based at least in part on PRACH repetition levels used within a narrowband. The network node 115, the determining module 450, and/or the processor 420 may be configured to use the indicator, f_id, to enumerate a used narrowband. The starting subframe number may indicate one of: a first subframe in a PRACH transmission; and one of X starting opportunities in a Y-ms period, where Y=X*PRACH repetition level.

The network node 115, the receiving module 470, and/or the processor 420 may be configured to receive the random access preamble from the UE 110. Furthermore, the network node 115, the communication module 460, and/or the processor 420 may be configured to transmit to the UE 110, the random access response identified by the calculated RA-RNTI.

The network node 115, the communication module 460, and/or the processor 420 may be configured to use the higher layer configuration to configure the one or more PRACH resource sets in the broadcast message.

The network node 115, the communication module 460, and/or the processor 420 may be configured to broadcast one or more CE PCIs.

Processor 420 may include any suitable combination of hardware and software implemented in one or more modules to execute instructions and manipulate data to perform some or all of the described functions of network node 115. In some embodiments, processor 420 may include, for example, one or more computers, one or more central processing units (CPUs), one or more microprocessors, one or more applications, and/or other logic.

Memory 430 is generally operable to store instructions, such as a computer program, software, an application including one or more of logic, rules, algorithms, code, tables, etc. and/or other instructions capable of being executed by a processor. Examples of memory 430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 440 is communicatively coupled to processor 420 and may refer to any suitable device operable to receive input for network node 115, send output from network node 115, perform suitable processing of the input or output or both, communicate to other devices, or any combination of the preceding. Network interface 440 may include appropriate hardware (e.g., port, modem, network interface card, etc.) and software, including protocol conversion and data processing capabilities, to communicate through a network.

The determining module may perform the processing functions of network node 115. The determining module may include or be included in processor 420. The determining module may include analog and/or digital circuitry configured to perform any of the functions of the determining module and/or processor 420. The functions of the determining module may, in certain embodiments, be performed in one or more distinct modules.

The communication module may perform the transmission functions of network node 115. The communication module may transmit messages to one or more of wireless devices 110. The communication module may include a transmitter and/or a transceiver, such as transceiver 410. The communication module may include circuitry configured to wirelessly transmit messages and/or signals. In particular embodiments, the communication module may receive messages and/or signals for transmission from the determining module or any other module.

The receiving module may perform the receiving functions of network node 115. The receiving module may receive any suitable information from a wireless device. The receiving module may include a receiver and/or a transceiver. The receiving module may include circuitry configured to wirelessly receive messages and/or signals. In particular embodiments, the receiving module may communicate received messages and/or signals to the determining module or any other suitable module.

Other embodiments of network node 115 may include additional components beyond those shown in FIG. 4 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 5:
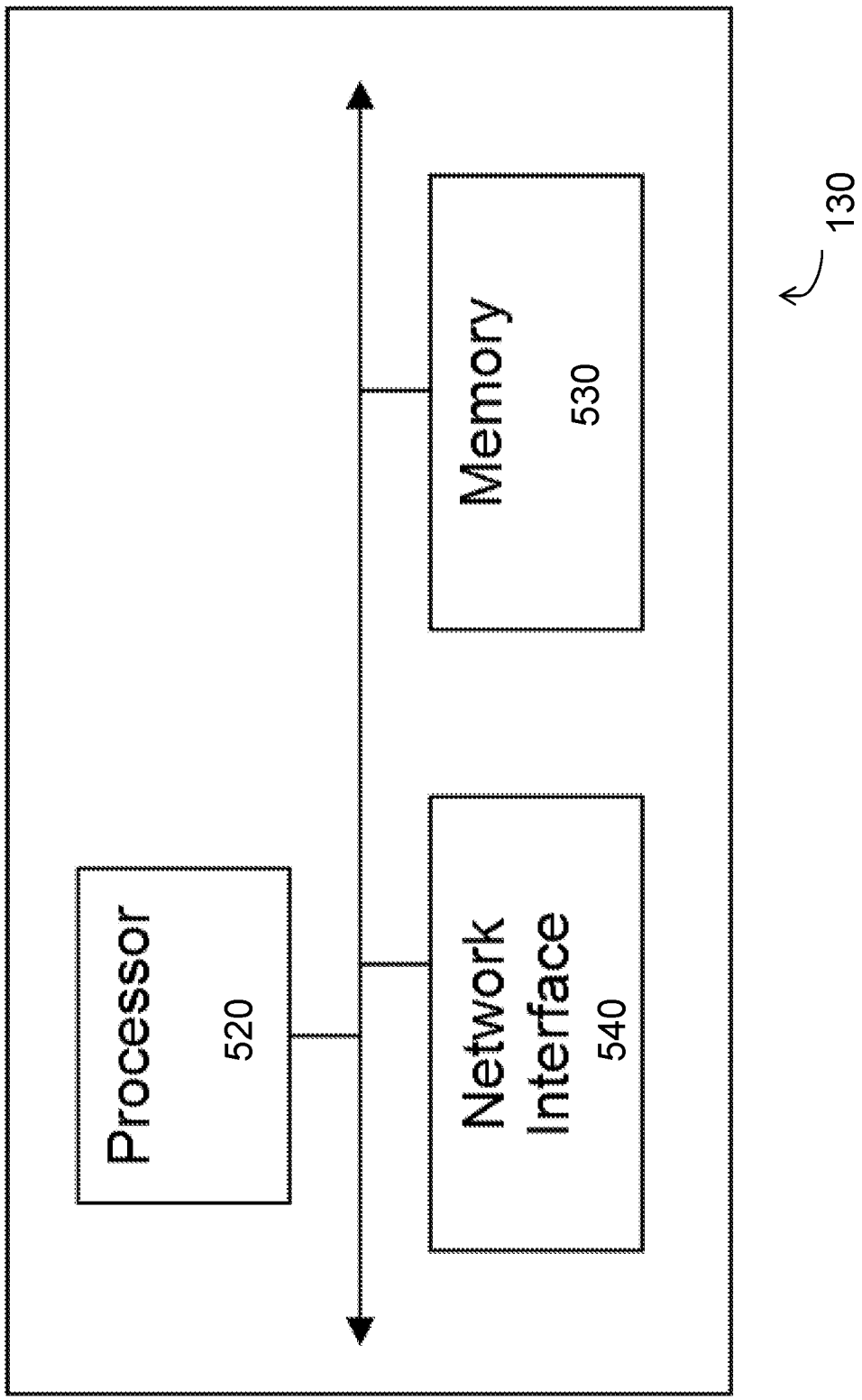
FIG. 5 is a schematic block diagram of an exemplary radio network controller or core network node, in accordance with certain embodiments.

FIG. 5 is a block schematic of an exemplary radio network controller or core network node 130, in accordance with certain embodiments exemplifying the network node 115. Examples of network nodes may additionally include a mobile switching center (MSC), a serving GPRS support node (SGSN), a mobility management entity (MME), a radio network controller (RNC), a base station controller (BSC), and so on. The radio network controller or core network node 130 e.g. include a processor 520, a memory 530, and a network interface 540. In some embodiments, processor 520 executes instructions to provide some or all of the functionality described above as being provided by the network node, memory 530 stores the instructions executed by processor 520, and network interface 540 communicates signals to any suitable node, such as a gateway, switch, router, Internet, Public Switched Telephone Network (PSTN), network nodes 115, radio network controllers or core network nodes 130, etc.

Processor 520 may include any suitable combination of hardware and software implemented in one or more modules to execute instructions and manipulate data to perform some or all of the described functions of the radio network controller or core network node 130. In some embodiments, processor 520 may include, for example, one or more computers, one or more central processing units (CPUs), one or more microprocessors, one or more applications, and/or other logic.

Memory 530 is generally operable to store instructions, such as a computer program, software, an application including one or more of logic, rules, algorithms, code, tables, etc. and/or other instructions capable of being executed by a processor. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 540 is communicatively coupled to processor 520 and may refer to any suitable device operable to receive input for the network node, send output from the network node, perform suitable processing of the input or output or both, communicate to other devices, or any combination of the preceding. Network interface 540 may include appropriate hardware (e.g., port, modem, network interface card, etc.) and software, including protocol conversion and data processing capabilities, to communicate through a network.

Other embodiments of the network node may include additional components beyond those shown in FIG. 5 that may be responsible for providing certain aspects of the network node's functionality, including any of the functionality described above and/or any additional functionality (including any functionality necessary to support the solution described above).

Summary of Example Implementation

In certain embodiments, a method in a network node is disclosed. In an example embodiment, the method may comprise defining one or more parameters of a coverage enhanced PRACH Configuration Index (CE PCI) for one or more PRACH resource sets, each of the one or more PRACH resource sets associated with a coverage level, configuring the one or more PRACH resource sets in a broadcast message, assigning a starting subframe number t_id to a PRACH resource set used by a user equipment, and calculating an RA-RNTI using the assigned t_id. In certain example embodiments:

a higher layer configuration (i.e., RRC signaling) is used by the network node to configure the CE PRACH resource in a broadcast message;

the defined one or more parameters may include PRACH Configuration Index (as defined in legacy system), number of repetitions of the legacy random access preamble defined by PRACH Configuration Index, starting system frame number (SFN), and starting subframe of a PRACH attempt (where one PRACH attempt may involve multiple repetitions);

optionally, broadcasting one or more CE PCIs;

optionally, calculating the RA-RNTI based at least in part on PRACH repetition levels used within a narrowband;

using f_id to enumerate a used narrowband;

the t_id indicates one of: a first subframe in a PRACH transmission; and one of X starting opportunities in a Y-ms period (where Y=X*PRACH repetition level.

Also disclosed is a method in a UE. In an example embodiment, the method may comprise transmitting a random access preamble to a network node, and receiving a random access response identified by an RA-RNTI, the RA-RNTI calculated using a t_id assigned to a PRACH resource set used by the user equipment. In certain example embodiments, the method further comprises:

choosing a PRACH resource set according to a coverage level, each PRACH resource set having an associated CE PCI.

Certain embodiments of the present disclosure may provide one or more technical advantages. For example, in certain embodiments RA-RNTI calculation is modified so it can be used with Rel-13 LC and/or CE UEs. Other advantages may be readily apparent to one having skill in the art. Certain embodiments may have none, some, or all of the recited advantages.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure.

Other changes, substitutions, and alterations are possible without departing from the spirit and scope of this disclosure, as defined by the following claims.

ABBREVIATIONS USED IN THE PRECEDING DESCRIPTION INCLUDE

CE Coverage Enhanced
eNB eNodeB
FDD Frequency Division Duplex
LC Low Complexity
LTE Long Term Evolution
MAC Medium Access Control
PCI PRACH Configuration Index
PDCCH Physical Downlink Control Channel
PRACH Physical Random Access Channel
PRB Physical Resource Block
RA Random Access
RAR Random Access Response
RA-RNTI Random Access Radio Network Temporary Identifier
RRC Radio Resource Control
RSRP Reference Signal Received Power
SFN System Frame Number
TDD Time Division Duplex
UE User Equipment

The invention claimed is:

1. A method performed by a network node, the method comprising:
    defining one or more parameters of a Coverage Enhanced Physical random access channel Configuration Index (CE PCI) for one or more Physical Random Access Channel (PRACH) resource sets, where each of the one or more PRACH resource sets is associated with a coverage level, and where a different CE PCI is defined for each coverage level;
    configuring the one or more PRACH resource sets in a broadcast message;
    determining, from among X possible starting opportunities within a Y millisecond (ms) period that is longer than one frame, which starting opportunity was used by a User Equipment (UE) for starting PRACH repetitions according to one of the coverage levels, wherein X is a defined value and Y=X*PRACH repetition level;
    calculating a Random Access Radio Network Temporary Identifier (RA-RNTI) based on the determined starting opportunity; and
    transmitting a Random Access Response (RAR) for the UE, where the RAR is identified by the calculated RA-RNTI.

2. The method according to claim 1, wherein a higher layer configuration is used by the network node to configure the one or more PRACH resource sets in the broadcast message.

3. The method according to claim 1, wherein the one or more parameters comprise any one or more out of: a PRACH Configuration Index, a number of repetitions of a legacy random access preamble defined by the PRACH Configuration Index, a starting System Frame Number (SFN), and a starting subframe of a PRACH attempt.

4. The method according to claim 1, wherein the configuring comprises broadcasting one or more CE PCIs.

5. The method according to claim 1, wherein each starting opportunity is uniquely numbered within the Y ms period and wherein calculating the RA-RNTI comprises calculating the RA-RNTI based on the unique number of the determined starting opportunity.

6. The method according to claim 5, wherein the X starting opportunities are respective subframes within the more than one frame spanned by the Y ms period, and wherein calculating the RA-RNTI based on the determined starting opportunity comprises calculating the RA-RNTI in dependence on an identifier that uniquely defines the determined starting opportunity within the Y ms period.

7. A method performed by a User Equipment (UE), the method comprising:
    choosing a Physical Random Access Channel (PRACH) resource set according to a coverage level, each PRACH resource set having an associated Coverage Enhanced PRACH Configuration Index (CE PCI);
    selecting a starting opportunity for starting PRACH repetitions according to the coverage level, from among X possible starting opportunities within a Y millisecond (ms) period that is longer than one frame, wherein X is a defined value and Y=X* PRACH repetition level;
    transmitting a random access preamble to a network node, with repetitions of the random access preamble starting in the selected starting opportunity; and
    monitoring for reception of a Random Access Response (RAR) identified by a Random Access Radio Network Temporary Identifier (RA-RNTI) calculated in dependence on the selected starting opportunity.

8. A network node, comprising:
    communication circuitry configured for communicating with User Equipments (UEs); and
    processing circuitry operatively associated with the communication circuitry and configured to:
        define one or more parameters of a Coverage Enhanced Physical random access channel Configuration Index (CE PCI) for one or more Physical Random Access Channel (PRACH) resource sets, where each of the one or more PRACH resource sets is associated with a coverage level, and where a different CE PCI is defined for each coverage level;
        configure the one or more PRACH resource sets in a broadcast message;
        determine, from among X possible starting opportunities within a Y millisecond (ms) period that is longer than one frame, which starting opportunity was used by a User Equipment (UE) for starting PRACH repetitions according to one of the coverage levels, wherein X is a defined value and Y=X* PRACH repetition level;
        calculate a Random Access Radio Network Temporary Identifier (RA-RNTI) using the determined starting opportunity; and
        transmit Random Access Response (RAR) for the UE, where the RAR is identified by the calculated RA-RNTI.

9. The network node according to claim 8, wherein the processing circuitry is configured to use a higher layer configuration to configure the one or more PRACH resource sets in the broadcast message.

10. The network node according to claim 8, wherein the one or more parameters comprise any one or more out of: a PRACH Configuration Index, a number of repetitions of a legacy random access preamble defined by the PRACH Configuration Index, a starting System Frame Number (SFN) and a starting subframe of a PRACH attempt.

11. The network node according to claim 8, wherein the processing circuitry is configured to broadcast one or more CE PCIs.

12. The network node according to claim 8, wherein each starting opportunity is uniquely numbered within the Y ms period and wherein the processing circuitry is configured to calculate the RA-RNTI based on the unique number of the determined starting opportunity.

13. The network node according to claim 12, wherein the X starting opportunities are respective subframes within the more than one frame spanned by the Y ms period, and wherein the processing circuitry is configured to calculate the RA-RNTI based on the determined starting opportunity by calculating the RA-RNTI in dependence on an identifier that uniquely defines the determined starting opportunity within the Y ms period.

14. A User Equipment (UE), comprising:
    communication circuitry configured for communicating with a wireless communication network; and
    processing circuitry operatively associated with the communication circuitry and configured to:
        choose a Physical Random Access Channel (PRACH) resource set according to a coverage level, each PRACH resource set having an associated Coverage Enhanced PRACH Configuration Index (CE PCI);
        select a starting opportunity for starting PRACH repetitions according to the coverage level, from among X possible starting opportunities within a Y millisecond (ms) period that is longer than one frame, wherein X is a defined value and Y=X*PRACH repetition level;

transmit a random access preamble to a network node, with repetitions of the random access preamble starting in the selected starting opportunity; and monitor for reception of a Random Access Response (RAR) identified by a Random Access Radio Network Temporary Identifier (RA-RNTI) calculated in dependence on the selected starting opportunity.

\* \* \* \* \*